United States Patent [19]

Nakanishi et al.

[11] 3,714,132

[45] Jan. 30, 1973

[54] UNITARY LIQUID POLYSULFIDE POLYMER COMPOSITION

[75] Inventors: Osamu Nakanishi, Ibaraki-shi, Osaka-fu; Ikuo Tanaka, Kasatsu-shi, Shiga-ken, both of Japan

[73] Assignee: Sekisui Kagaku Kogyo Kabushiki Kaisha, Osaka, Japan

[22] Filed: Dec. 14, 1970

[21] Appl. No.: 98,203

[52] U.S. Cl. ............. 260/79, 117/124 D, 117/124 F, 260/33.8 R, 260/33.8 SB, 260/37 SB, 260/46.5 E, 260/46.5 G, 260/79.1, 260/824 R
[51] Int. Cl. .............................................. C08g 23/00
[58] Field of Search ..... 260/46.5 E, 46.5 G, 79, 79.1, 260/824 R

[56] References Cited

UNITED STATES PATENTS

| | | | |
|---|---|---|---|
| 3,586,660 | 6/1971 | Sakata et al. | 260/79 |
| 3,123,495 | 3/1964 | Carpenter et al. | 117/72 |
| 3,476,826 | 11/1969 | Millen | 260/824 |
| 3,317,461 | 5/1967 | Plueddemann | 260/46.5 |
| 3,225,017 | 12/1965 | Seegman et al. | 260/79.1 |

*Primary Examiner*—Donald E. Czaja
*Assistant Examiner*—Melvyn I. Marquis
*Attorney*—Wenderoth, Lind & Ponack

[57] ABSTRACT

A unitary polysulfide polymer composition protected from moisture and capable of being stored in a condition stable in a single container without undergoing curing and capable of being cured on contact with moisture in the atmosphere, said composition comprising (*a*) 100 parts by weight of a liquid polysulfide polymer, (*b*) a curing agent capable of being activated in the presence of an acid, and (*c*) 0.5 to 10 parts by weight of an organosilicon compound having at least one carbon atom and at least one RCOO— group, wherein R is hydrogen or a lower alkyl group, bonded to the silicon atom.

7 Claims, No Drawings

UNITARY LIQUID POLYSULFIDE POLYMER COMPOSITION

This invention relates to unitary liquid polysulfide polymer compositions for use as sealants, adhesives and the like.

Liquid polysulfide polymers having terminal mercapto groups (—SH) in their molecule are cured at room temperature when mixed with a curing agent such as lead peroxide, and become rubbery elastomers having excellent resistance to weathering, oil, ozone or water, thus finding a wide range of applications as adhesives, sealants, and the like.

It is necessary to mix the liquid polysulfide polymers and the curing agent such as lead peroxide just prior to use since the premixing of these with each other will result in curing of the polymers. This requires troublesome labor, and a part of the polymer remaining unused cannot be re-used because of curing. This is of course not economical.

With a view to removing these defects, attempts have been made to provide a unitary composition comprising a liquid polysulfide polymer and a suitable curing agent in a container, which will be cured when used as an adhesive, sealant, and the like. For example. U.S. Pat. No. 3,225,017 discloses a unitary liquid polysulfide composition comprising a liquid polysulfide polymer, a curing agent such as zinc peroxide to be activated by the presence of moisture, and a deliquescent agent such as sodium hydroxide. These unitary polysulfide polymer compositions have defects such as poor storage stability and slow rate of curing, and have not come into widespread use.

It is already known that metal peroxides generally accelerate the curing of activated liquid polysulfide polymers in an alkaline atmosphere, and that certain acidic substances, such as stearic acid and oleic acid, retard the curing of liquid polysulfide polymers. Hence, prior to the invention, no worker hit upon an idea of accelerating the curing of the polysulfide polymer composition by an acidic substance.

An object of the present invention is to remove the aforementioned defects of the polysulfide polymer compositions, and to provide unitary liquid polysulfide polymer compositions having good storage stability and fast rate of curing.

The objects and advantages of the invention will become more apparent from the following description.

It has now been found that peroxides of alkali metals, alkaline earth metals and other metals, such as zinc peroxide, cadmium peroxide, calcium peroxide or manganese dioxide as curing agents are inactive in a neutral condition, but surprisingly, are activated by a lower organic fatty acid such as acetic acid or propionic acid to cure the liquid polysulfide polymers; and that the use of a specific organosilicon compound, which releases a lower organic fatty acid on reaction with water and self-condenses to a high-molecular-weight compound, leads to a marked acceleration of curing the polysulfide polymer.

According to the invention, there is provided a unitary polysulfide composition comprising a liquid polysulfide polymer, a curing agent to be activated in the presence of an acid, and an organosilicon compound in which at least one carbon atom and at least one RCOO- group, wherein R is hydrogen or a lower alkyl group, are attached to the silicon atom.

The liquid polysulfide polymers that can be used conveniently in the present invention are the so-called polyalkylene polysulfide polymers expressed by the general formula

HSRSS—RSS—RSH and are composed substantially of RSS units containing an organic group R, the straight chain having a mercapto group at both ends. The molecular weight of the liquid polysulfide polymer may vary depending upon the number of RSS units and the structures of the respective organic groups R. The organic group R is a saturated aliphatic group, i.e. a divalent group consisting mainly of carbon atoms and hydrogen atoms. The group however may contain an oxygen atom or sulfur atom besides these. In this instance, the oxygen atom may be present as $\equiv$ C—O—C $\equiv$ or —OH group, and the sulfur atoms as $\equiv$ C—S—C $\equiv$ or —SH. Also usable as the liquid polysulfide polymers in the invention are those having more than two chained sulfur atoms per unit polysulfide linkage, and also —SSH terminal groups.

Especially preferred liquid polysulfide polymers are those having a molecular weight of about 1,000 to 8,000, a viscosity of 10 to 2,000 poises, and a degree of cross linkages of about 20 percent or less. The preferred examples include Thiokol LP-2 and Thiokol LP-32 (tradenames) produced by Thiokol Corporation, U. S. A.

The curing agent used in the invention has the property of curing the liquid polysulfide polymer upon being activated in the presence of an acid, especially a lower fatty acid such as acetic acid, propionic acid or formic acid. Such curing agent includes, for example, peroxides of alkali metals, alkaline earth metals and other metals, specifically zinc peroxide, cadmium peroxide, barium peroxide, magnesium peroxide, sodium peroxide, calcium peroxide, or manganese dioxide. Of these, zinc peroxide is especially preferred by reason of fast rate of curing and good storage stability. Preferably, the amount of the curing agent is 5 to 20 parts by weight per 100 parts by weight of the liquid polysulfide polymer.

The organosilicon compounds used in the invention are silane derivatives in which at least one carbon atom and at least one RCOO— group are bonded to the silicon atom. That at least one carbon atom is bonded to the silicon atom means that the organosilicon compound has at least one carbon atom directly bonded to the silicon atom. For instance, this includes a case wherein one to three alkyl groups such as methyl or ethyl are bonded to the silicon atom.

In the group RCOO—, R is hydrogen or a lower alkyl group, preferably having one to five carbon atoms. Since the organosilicon compound used in the present invention has RCOO— group bonded to the silicon atom, it is hydrolyzed by reaction with water to release a lower fatty acid, and the RCOO— group is replaced by the HO— group. The HO— groups bonded to the silicon atoms have reactivity, and are condensed to each other by dehydration reaction.

Thus, the organosilicon compound used in the invention releases a lower fatty acid on reaction with water, and is condensed by the dehydration reaction between HO—groups resulting from the hydrolysis. When the organosilicon compound has 2 or more RCOO— groups bonded to the silicon atoms, it releases a lower fatty acid as a result of reaction with water, and is polycondensed to a high-molecular-weight substance. If, on the other hand, the organosilicon compound used in the invention has one RCOO— group, it releases a lower fatty acid as a result of reaction with water, and two molecules of the organosilicon compound are condensed by the dehydration reaction of the resulting HO— groups, to form a dimer. When the organosilicon compound has an organic group, such as an alkoxy group, for instance methoxy or ethoxy, having an oxygen atom directly bonded to the silicon atoms, in addition to one RCOO— group, the resulting HO— groups react with the organic group having an oxygen directly bonded to the silicon atoms to form a condensate having more than 2 molecules.

As described above, the organosilicon compound used in the present invention releases a lower fatty acid on reaction with water, and is converted to a polycondensate having a longer chain. This contributes greatly to the curing of the unitary polysulfide polymer composition of the invention and the shortening of the curing time. An organosilicon compound which will be converted to a high-molecular-weight polycondensate having a long chain upon reaction with water has a tendency of curing the unitary liquid polysulfide polymer composition of the invention faster than that which will be converted to a dimer. Hence, in comparison with those organo-silicon compounds having one RCOO— group bonded to the silicon atom but being free from an organic group having an oxygen atom bonded to the silicon atoms, organosilicon compounds having a plurality of RCOO— groups bonded to the silicon atoms or organosilicon compounds having one RCOO— group bonded to the silicon atom and an organic group, such as an alkoxy group, having an oxygen atom bonded to the silicon atom are preferred.

The organosilicon compounds that are used in the invention have at least one carbon atom bonded to the silicon atoms, such as at least one alkyl group, such as methyl or ethyl, bonded to the silicon atom. The presence of a carbon atom bonded to the silicon atom in a high-molecular-weight substance which results from the reaction of the organosilicon compound with water to release a lower fatty acid and the subsequent self-polycondensation, serves to impart proper flexibility, suppleness, compatibility, etc. to rubbery elastomers formed by the curing of the liquid polysulfide polymer compositions. Hence, the polycondensate of the organo-silicon compound used in the invention does not in any way damage the characteristics of rubber elastomers resulting from the curing of liquid polysulfide polymer compositions.

The preferred examples of the organosilicon compounds that may be used in the invention include methyl-diacetoxy-chloro-silane, dimethyl-diacetoxy-silane, ethyl-triacetoxy-silane, methyl-triacetoxy-silane, vinyl-triacetoxy-silane, isopropyl-triacetoxy-silane, triisoamyloxy-acetoxy-silane, and methylvinyl-diacetoxy-silane. Of these, methyl-diacetoxy-chloro-silane, dimethyl-diacetoxy-silane, ethyl-triacetoxy-silane and vinyl-triacetoxy-silane are liquid at room temperature, and can be easily admixed with the liquid polysulfide polymer. Methyl-triacetoxy-silane, ethyl-triacetoxy-silane and vinyl-triacetoxy-silane are especially effective on account of their fast rate of curing the polymer. It is preferred in the present invention that the amount of the organosilicon compound should be 0.5 to 10 parts by weight per 100 parts by weight of the liquid polysulfide polymer.

The production of the unitary liquid polysulfide polymer composition of the present invention can be performed by mixing in a dry condition the liquid polysulfide polymer, the curing agent to be activated in the presence of an acid, and the organosilicon compound. The composition so obtained is not cured because of the absence of an acid. In the production of the unitary liquid polysulfide polymer composition of the present invention, the materials may be added in any order, and any mixing means can be used such as the use of a stirrer. It is necessary however that the materials should be mixed in a dry condition in order to maintain the composition anhydrous.

If desired, plasticizers such as dibutyl phthalate, chlorinated paraffins, or diphenyl pentachloride and fillers or pigments such as calcium carbonate, carbon black, clay or titanium oxide may be added to the unitary liquid polysulfide polymer composition. polysulfide polymer The unitary liquid polysulfide composition so obtained is stored in a dry condition in a suitable closed container such as a tube. In this condition, the composition can be maintained liquid for long periods of time.

When the unitary liquid polysulfide polymer composition of the invention is desired to be used as a sealant or adhesive, it is taken out of the container, applied to the desired portions, and then allowed to stand in an atmosphere containing moisture, for instance in the air. The liquid polysulfide composition of the invention then absorbs moisture, and is cured to a rubbery elastomer within a short time.

The unitary polysulfide polymer composition of the invention can be cured for a much shorter period of time than the conventional unitary liquid polysulfide polymer composition, and gives a rubbery elastomer having physical properties comparable to those of a rubbery elastomer of the conventional liquid polysulfide polymer. Moreover, the composition of the present invention has superior stability during storage. The unitary liquid polysulfide composition of the present invention has an outstanding technical significance in that its marked effects, especially fast rate of curing, are the removal of the greatest defect of the conventional unitary polysulfide polymer composition.

The reason for this curing of the unitary polysulfide composition of the invention in a short period of time is not clear, but may roughly be explained as follows:

The organosilicon compound of the invention contained in the unitary polysulfide polymer composition reacts with water in the air, and a lower fatty acid is released. The lower fatty acid so release activates the curing agent contained in the composition, whereby the curing of the liquid polysulfide polymer begins. On the other hand, in the organo-silicon compound, HO- groups resulting from the hydrolysis react with each other, and by condensation, the length of the chain of the organosilicon compound becomes longer, and the molecular weight increases. Simultaneously, water is released. The released water again induces the hydrolysis of unreacted organosilicon compound to release a fresh lower fatty acid, and the lower fatty acid so released activates the curing agent. It is assumed that a water-induced reaction for utilizing moisture absorbed into the composition for the activation of the curing agent and a reaction of converting the organosilicon compound to a high-molecular-weight compound proceed successively in the unitary liquid polysulfide polymer composition. These reactions appear to be the reason for the shortening of the curing time.

In short, the unitary polysulfide polymer composition of the present invention comprising a liquid polysulfide polymer, a curing agent to be activated in the presence of an acid and an organosilicon compound having at least one carbon atom and at least one RCOO— group, R being hydrogen or a lower alkyl group, bonded directly to the silicon atoms has much faster rate of curing than the conventional unitary polysulfide polymer composition. Furthermore, it gives a rubbery elastomer having excellent resistances to oil, whether or ozone comparable to a rubbery elastomer of the conventional liquid polysulfide polymer composition. Also, the composition of the invention has good storage stability.

The following Examples will illustrate the present invention.

EXAMPLE 1

| Liquid LP-polymer (Thiokol L/P-32, tradename) | 200 g |
| Zinc peroxide | 20 g |

The above ingredients were well mixed with a roll, and the resulting mixture was dried in vacuo for complete dehydration. In a dry condition, 4 g of methyl-triacetoxysilane was added to the mixture to form a composition. The resulting composition was charged into a cartridge for a sealing gun, and stored at 20° C. and RH of 60 percent.

After a lapse of 6 months, the composition contained in the cartridge was extruded onto a glass plate. No change was observed as compared with the composition before storage. The composition on the glass plate lost tackiness on the surface in 30 minutes, nd was cured in 2 hours to a tough rubbery elastomer.

Separately, the mixture before adding methyl-triacetoxy-silane was allowed to stand in the atmospheric air for 6 month, but was not cured.

EXAMPLE 2

The procedure of Example 1 was repeated except that 5 g of methyl-diacetoxy-chlorosilane was used insted of 4 g of methyl-triacetoxy-silane. A part of the resulting composition was allowed to stand on a glass plate. In 50 minutes, it lost tackiness on the surface, and in 4 hours, was cured to a rubbery elastomer.

On the other hand, the composition was charged into a cartridge for a sealing gun, and stored for 6 months at 20° C. and RH of 60 percent. No change was observed during the storage. When it was extruded onto a glass plate, it lost tackiness on the surface in about 50 minutes, and in 4 hours, was cured to a rubbery elastomer.

EXAMPLE 3

The procedure of Example 1 was repeated except that 6 g of dimethyl-diacetoxy-silane was used instead of 4 g of methyl-triacetoxy-silane. The same tests as in Example 1 were performed as to the curing time and storage stability of the resulting composition. The results were the same as those obtained in Example 2.

EXAMPLE 4

| Liquid polysulfide polymer (Thiokol LP-32, tradename) | 200 g |
| Cadmium peroxide | 20 g |
| Carbon black | 30 g |
| Calcium carbonate | 10 g |
| Titanium oxide | 10 g |
| Diphenyl pentachloride | 50 g |

The above ingredients were well mixed with three rolls. The resulting mixture was dried in vacuo for complete dehydration. In a dry condition, 5 g of methyl-triacetoxysilane was added to the mixture to form a composition. The resulting composition was charged into a cartridge for a sealing gun, and stored at 20° C. and RH of 60 percent. There was no change observed in the composition after a lapse of six months. When the composition was cast in a sheet form onto a glass plate, it lost tackiness on the surface in 40 minutes, and in 5 hours, was cured to a rubbery elastomer sheet.

COMPARATIVE EXAMPLE 1

| Liquid polysulfide polymer (Thiokol LP-32, tradename) | 200 g |
| Carbon black | 30 g |
| Calcium carbonate | 10 g |
| Titanium oxide | 10 g |
| Diphenyl pentachloride | 50 g |

The above ingredients were well mixed by means of three rolls. The resulting mixture was admixed with 16 g of lead peroxide ($PbO_2$) used as a curing agent. The resulting composition was cured to a sheet-like rubbery elastomer. It was found that this composition could not be stored in liquid condition because it was rapidly cured.

The physical properties of the rubbery elastomers obtained in Example 4 and Comparative Example 1 were measured, and the results are shown in Table 1 below.

TABLE 1

| (Shore-A) | Hardness | 100 % Modulus (Kg/cm²) | 200 % Modulus (Kg/cm²) | Tensile strength (Kg/cm²) | Elongation (%) |
|---|---|---|---|---|---|
| Ex. 4 | 52 | 8.5 | 18.6 | 28.3 | 510 |
| Comp. Ex. 1 | 53 | 9.2 | 18.3 | 30.4 | 490 |

The results show that there is not significant difference in physical properties between the rubbery elastomer obtained in Example 4 and that obtained in Comparative Example 1.

EXAMPLE 5

| Liquid polysulfide polymer (Thiokol LP-32, tradename) | 200 g |
| Calcium peroxide | 20 g |
| Titanium oxide | 10 g |
| Carbon Black | 10 g |
| Diphenyl pentachloride | 50 g |

The above ingredients were well mixed by means of three rolls, and the resulting mixture was dried in vacuo for complete dehydration. In a dry condition, 4 g of methyl-triacetoxy-silane was added to the mixture to form a composition. The composition was charged into a certridge for a sealing gun, and stored at 20° C. and RH of 60 percent. There was no change in the composition after a lapse of 6 months. When the composition was poured onto a glass plate and allowed to stand at room temperature, it lost tackiness on the surface in 30 minutes, and in about 3 hours, was cured completely to a rubbery elastomer. The physical properties of the composition obtained were found to be similar to those of the rubbery elastomer obtained in the present Example. There was no significant difference in properties between the composition of this Example and the rubber elastomer obtained by using lead peroxide as the curing agent.

EXAMPLE 6

| | |
|---|---|
| Liquid polysulfide polymer (Thiokol LP-32, tradename) | 200 g |
| Manganese dioxide | 20 g |
| Calcium carbonate | 30 g |
| Carbon black | 20 g |
| Diphenyl pentachloride | 50 g |

The above ingredients were mixed well by a roll, and the resulting mixture was completely dehydrated by drying in vacuo. In a dry condition, 5 g of dimethyl-diacetoxy-silane was added to the mixture to form a composition. A part of the resulting composition was poured onto a glass plate, and allowed to stand at room temperature. The remainder was charged into a cartridge for a sealing gun, and stored at 20° C. and RH of 60 percent. The composition on the glass plate lost tackiness on the surface in 40 minutes, and in 5 hours, was cured to a rubbery elastomer.

On the other hand, the composition stored in the cartridge did not undergo any change during storage. After the end of the 6 months' storage, the composition was taken out onto a glass plate. It was cured after a lapse of the same time as given above.

EXAMPLE 7

The procedure of Example 1 was repeated except that 200 g of liquid polysulfide polymer (Thiokol LP-2, tradename) was used instead of 200 g of the liquid polysulfide polymer (Thiokol LP-32) to form a unitary liquid polysulfide polymer composition. When the resulting composition was placed on a glass plate, it lost tackiness on the surface in 30 minutes, and in 4 hours, was cured to a rubbery elastomer. On the other hand, when the composition was charged in a cartridge for a sealing gun and stored at 20° C. and RH of 60 percent, it did not undergo any change during storage for 6 months.

COMPARATIVE EXAMPLE 2

| | |
|---|---|
| Liquid polysulfide polymer (Thiokol LP-32, tradename) | 200 g |
| Zinc peroxide | 20 g |
| Carbon black | 30 g |

The above ingredients were well mixed with a roll, and the resulting mixture was completely dehydrated by drying in vacuo. In a dry condition, 1 g of sodium hydroxide was added to the mixture to form a unitary polysulfide composition. A part of the resulting composition was taken out on a glass plate, and allowed to stand at room temperature. The remainder was charged into a cartridge for a sealing gun, and stored at 20° C. and RH of 60 percent. The composition on the glass plate lost tackiness on the surface in 24 hours, and it took nearly one month until it was completely cured.

On the other hand, a rise in viscosity was observed in the composition stored in the cartridge at a time about 3 months after initiation of storage. Thus, the composition was found to be poor in storage stability.

EXAMPLE 8

The procedure of Example 1 was repeated except that 6 g of vinyl-triacetoxy-silane was used instead of 4 g of the methyl-triacetoxy-silane. The resulting composition could be stored for 6 months in a cartridge for a sealing gun with good stability. When the composition was taken out from the cartridge, it lost surface tackiness in 30 minutes, and was completely cured in 2 hours.

What we claim is:

1. A unitary polysulfide polymer composition protected from moisture and capable of being stored stably in a single container without undergoing curing and capable of being cured on contact with moisture in the atmosphere, said composition comprising
   a. 100 parts by weight of a liquid polysulfide polymer having terminal mercapto groups,
   b. 5 to 20 parts by weight of a curing agent for the polymer selected from the group consisting of zinc peroxide, cadmium peroxide, calcium peroxide, barium peroxide, magnesium peroxide, sodium peroxide and manganese dioxide, which curing agent is capable of being activated in the presence of an acid, and
   c. 0.5 to 10 parts by weight of an organosilicon compound selected from the group consisting of methyl-triacetoxy-silane, ethyl-triacetoxy-silane, vinyl-triacetoxy-silane and isopropyl-triacetoxy-silane.

2. The composition of claim 1, wherein said curing agent is zinc peroxide, an said organosilicon compound is methyl-triacetoxy-silane.

3. The composition of claim 1, wherein said curing agent is zinc peroxide, and said organosilicon compound is ethyl-triacetoxy-silane.

4. The composition of claim 1, wherein said organosilicon compound is methyl-triacetoxy-silane.

5. The composition of claim 1, wherein said organosilicon compound is ethyl-triacetoxy-silane.

6. The composition of claim 1, wherein said organosilicon compound is vinyl-triacetoxy-silane.

7. The composition of claim 1, wherein said curing agent is zinc peroxide, and said organosilicon compound is vinyl-triacetoxy-silane.

* * * * *